(12) United States Patent
Hsu (10) Patent No.: US 8,776,774 B2
(45) Date of Patent: Jul. 15, 2014

(54) ROTATING BARBEQUE GRILL ASSEMBLY

(76) Inventor: Huang-Hsi Hsu, Taipei (TW)

(*) Notice: Subject to any disclaimer, the term of this patent is extended or adjusted under 35 U.S.C. 154(b) by 598 days.

(21) Appl. No.: 13/064,517

(22) Filed: Mar. 30, 2011

(65) Prior Publication Data

US 2012/0174906 A1 Jul. 12, 2012

(30) Foreign Application Priority Data

Jan. 12, 2011 (TW) .............................. 100200656 U (51) Int. Cl.
*A47J 37/07* (2006.01)
(52) U.S. Cl.
USPC ................ 126/25 AA; 99/421 H; 99/421 HV; 126/25 R
(58) Field of Classification Search
USPC ................................. 126/25 AA, 25 R; 99/427
See application file for complete search history.

(56) References Cited

U.S. PATENT DOCUMENTS

| 2,629,314 | A | * | 2/1953 | Varady | 99/390 |
| 2,805,905 | A | * | 9/1957 | Levitan et al. | 108/145 |
| 4,114,523 | A | * | 9/1978 | Eff | 99/393 |
| 4,369,697 | A | * | 1/1983 | Millington | 99/351 |
| 4,442,762 | A | * | 4/1984 | Beller | 99/427 |
| 4,442,763 | A | * | 4/1984 | Beller | 99/427 |
| 4,562,771 | A | * | 1/1986 | Williams | 99/397 |
| 4,593,613 | A | * | 6/1986 | Waltman | 99/427 |
| 4,625,634 | A | * | 12/1986 | Kruper | 99/427 |
| 4,932,391 | A | * | 6/1990 | Bierdeman | 126/30 |
| 5,361,685 | A | * | 11/1994 | Riccio | 99/421 H |
| 5,419,249 | A | * | 5/1995 | Papandrea | 99/421 HH |
| 5,465,653 | A | * | 11/1995 | Riccio | 99/421 H |
| 5,497,697 | A | * | 3/1996 | Promny | 99/427 |
| 5,590,584 | A | * | 1/1997 | Ahn | 99/327 |
| 5,660,101 | A | * | 8/1997 | Cirigliano | 99/395 |
| D532,654 | S | * | 11/2006 | Raichlen et al. | D7/409 |
| 7,210,403 | B1 | * | 5/2007 | Tyndall | 99/427 |
| 7,514,651 | B2 | * | 4/2009 | Popeil et al. | 219/392 |
| 7,626,142 | B2 | * | 12/2009 | Backus et al. | 219/403 |
| 2007/0283945 | A1 | * | 12/2007 | Gabrielle | 126/25 AA |
| 2008/0191108 | A1 | * | 8/2008 | Hsu | 248/207 |
| 2011/0097468 | A1 | * | 4/2011 | Driscoll et al. | 426/519 |
| 2012/0024169 | A1 | * | 2/2012 | Hsu | 99/450 |
| 2012/0073453 | A1 | * | 3/2012 | Choi | 99/443 R |
| 2012/0080025 | A1 | * | 4/2012 | Choi | 126/25 AA |
| 2012/0163952 | A1 | * | 6/2012 | Hsu | 414/783 |
| 2012/0204732 | A1 | * | 8/2012 | Dondurur et al. | 99/427 |
| 2013/0104745 | A1 | * | 5/2013 | Stier | 99/421 R |

* cited by examiner

*Primary Examiner* — Avinash Savani
*Assistant Examiner* — George R Blum
(74) *Attorney, Agent, or Firm* — Bacon & Thomas, PLLC (57) ABSTRACT

The present invention relates to a rotating barbeque grill assembly that allows a user to put various food in a carrying frame thereof, parallelly install insert rods at both ends of the carrying frame into position-limit slots on both sides of a metal frame thereof respectively, and insert two transmission shafts into ends of fixed portions on both sides of the metal frame respectively. After the transmission shafts are fixed in the fixed portions, the user can turn on the barbeque apparatus, such that the metal frame can be rotated along the same axis of the two transmission shafts, and the carrying frame then slides from an original position far away from a heat source along the position-limit slots to a position proximate to the heat source, such that the food on both sides of the carrying frame can be heated uniformly and be barbequed to be a delicious dish quickly.

2 Claims, 8 Drawing Sheets

ROTATING BARBEQUE GRILL ASSEMBLY

FIELD OF THE INVENTION

The present invention relates to a rotating barbeque grill assembly that allows a user to put various food in a carrying frame, parallelly install insert rods at both ends of the carrying frame into position-limit slots on both sides of a metal frame respectively, and pass two transmission shafts into ends of fixed portions on both sides of the metal frame respectively, so that after the transmission shafts are clamped and fixed in the fixed portions, the user can turn on the barbeque apparatus, such that the metal frame can be rotated along the same axis of the two transmission shafts, and the carrying frame is then affected by its own gravity to slide from an original side far away from a heat source along the position-limit slots to a position proximate to the heat source, such that the food on both sides of the carrying frame can be heated uniformly in order to barbeque the food to a delicious dish quickly, which in turn avoids the food on the side closer to the heat source of the rotating barbeque grill from being burned or overcooked and the food on the other side farther from the heat source from being cooked insufficiently.

BACKGROUND OF THE INVENTION

Figure 1:
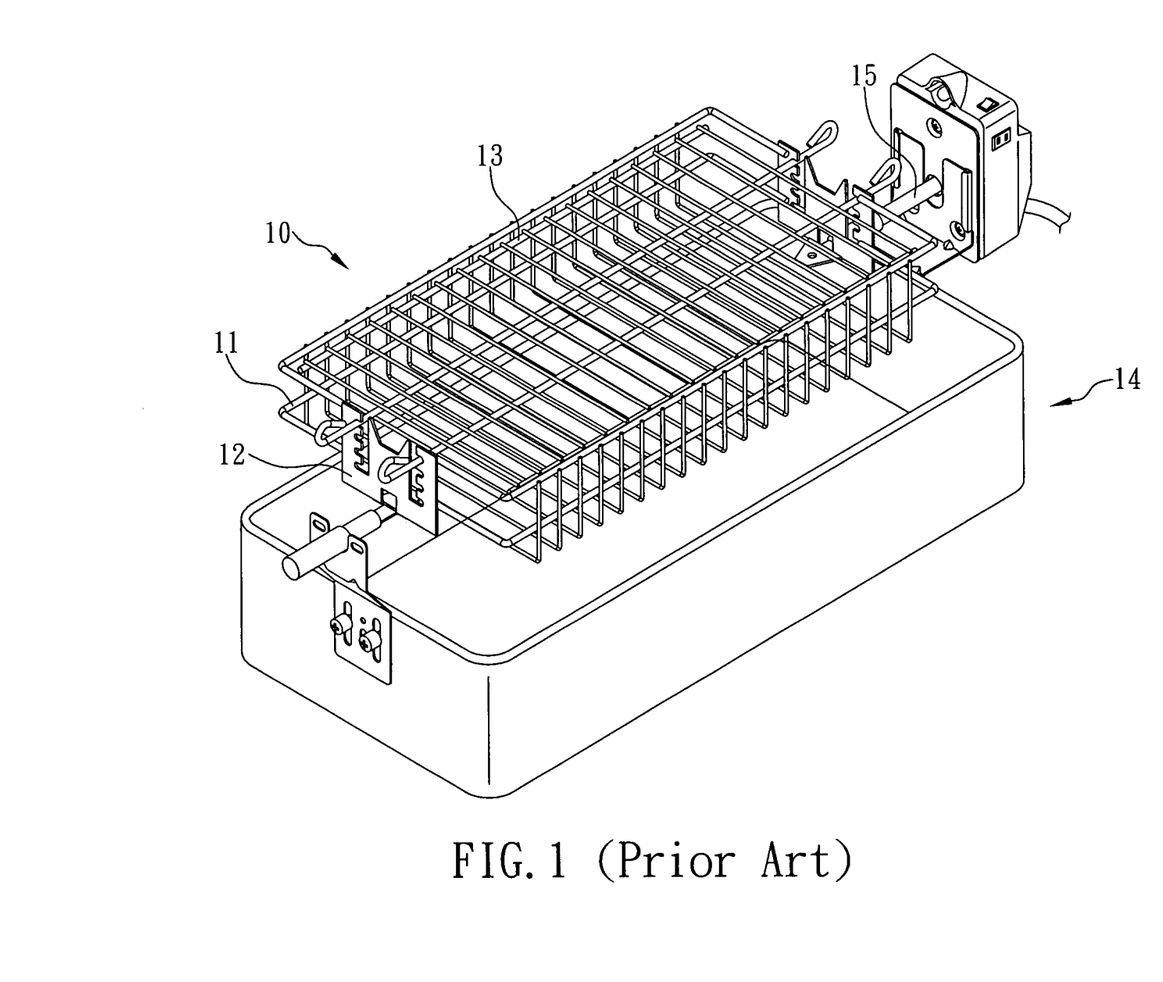
FIG. 1 is a schematic view of a conventional rotating barbeque grill.

As the five-day work week system is carried out, more and more people pay attentions to leisure activities in recent years. Among various leisure activities, barbeque is an indispensible and popular one, particularly conducted in a picnic or a short trip. In view of the popularity of barbeque, manufacturers developed various types of rotisseries and barbeque grills or stoves. For example, a conventional rotating barbeque grill 10 as shown in FIG. 1 comprises a metal frame 11, two metal plates 12 and a fixed frame 13, wherein the metal frame 11 is formed by a plurality of metal rods arranged with an interval apart and alternately soldered with each other, and the metal frame 11 includes a containing space defined therein for accommodating food. The metal plates 12 are symmetrically installed on both corresponding sides of the metal frame 11 for latching both ends of the fixed frame 13 respectively, such that the fixed frame 13 can be latched to the metal frame 11 and covered onto the top of the containing space. After a user puts various different kinds of food into the containing space of the metal frame 11, latches the fixed frame 13 with the metal plates 12, and covers the fixed frame 13 onto the top of the containing space, the fixed frame 13 will be able to limit various different kinds of food in the containing space. In the meantime, the user connects a motor transmission shaft 15 of a barbeque apparatus 14 to the conventional rotating barbeque grill 10 which contains various different kinds of food and turns on the barbeque apparatus 14 to rotate the conventional rotating barbeque grill 10, such that a heat source (such as charcoal fire) at the bottom of the barbeque apparatus 14 is used for barbequing the food in the conventional rotating barbeque grill 10, and users can turn and barbeque each kind of food by a combination of the conventional rotating barbeque grill 10 and barbeque apparatus 14.

Although the aforementioned conventional rotating barbeque grill 10 comes with a simple structure and becomes a popular barbeque tool, yet its practical application still has the following drawbacks. For example, a conventional rotating barbeque grill 10 is rotated in the barbeque apparatus 14, and food is heated and cooked by the heat source provided at the bottom of the barbeque apparatus 14. When the conventional rotating barbeque grill 10 is rotated, both left and right sides of the barbeque grill 10 are at positions closer to the heat source. As a result, the food near the left and right sides in the conventional rotating barbeque grill 10 will be cooked for a longer time and at a faster speed. On the other hand, the food placed at the top and bottom sides of the barbeque grill 10 is farther from the heat source will take much more time for the cooking, so that users have to extend the overall rotating and barbeque time of the conventional rotating barbeque grill 10. However, this arrangement will overcook the food near both sides in the conventional rotating barbeque grill 10. In other words, when the food at the top and bottom sides in the conventional rotating barbeque grill 10 is cooked, the food near the left and right sides is overcooked, not only ruining the delicious taste of the food, but also affecting our physical health.

Therefore, it is an important subject for related designers and manufacturers to design and develop a rotating barbeque grill assembly capable of repeatedly sliding food contained in a carrying frame of a barbeque apparatus along a position-limit slot of the rotating barbeque grill assembly to a position near the heat source to achieve the effect of heating the food on both sides in the carrying frame uniformly and avoid overcooking the food, since the conventional rotating barbeque grill has the drawbacks of taking too much time for cooking the food, which may be cooked either too raw or overcooked easily.

SUMMARY OF THE INVENTION

In view of the aforementioned shortcomings of the prior art, the inventor of the present invention based on years of experience in the related industry to conduct extensive researches and experiments, and finally designed and developed a rotating barbeque grill assembly in accordance with the present invention to overcome the shortcomings of the prior art.

Therefore, it is a primary objective of the present invention to provide a rotating barbeque grill assembly comprising a metal frame and a carrying frame. The metal frame is formed by coupling two positioning bases and a plurality of metal rods, and the two positioning bases are symmetrically installed on both corresponding sides of the metal frame, and a containing space is defined in the metal frame, wherein the containing space is in an open form interconnected to the outside. Each positioning base includes at least two position-limit slots penetrated through each positioning base and parallel to each other, and the position-limit slots of the two positioning bases are corresponsive to each other. Two insert rods are installed at both ends of the carrying frame respectively, and the insert rods can be built into the position-limit slots, such that the carrying frame is positioned in the containing space and slidable along the corresponding position-limit slot with the rotation of the metal frame, such that the carrying frame can slide to the allowable lowest position of the position-limit slot, and a fixed portion is disposed separately at a central position of each positioning base and far away from a side of the containing space, wherein the fixed portion is substantially in a hollow tube shape, such that two transmission shafts of a barbeque apparatus can be passed into an end of each fixed portion and clamped into the fixed portion.

Another objective of the present invention is to provide a rotating barbeque grill assembly that allows a user to put or insert various kinds of food in the carrying frame, parallelly install the insert rods at both ends of the carrying frame into the position-limit slots on both corresponding sides of the metal frame respectively, and pass each transmission shaft into an end of the corresponding fixed portion, so that after the transmission shaft is clamped and fixed in the fixed portion, the user can turn on the barbeque apparatus, such that the rotating barbeque grill assembly can be rotated by using the two transmission shafts as axles, and the food in the rotating barbeque grill assembly can be barbequed by the heat source of the barbeque apparatus. When the rotating barbeque grill assembly is turned at a predetermined angle (such as an angle of more than 90 degrees), the carrying frame is affected by its own gravity to slide from the original side far away from the heat source along the position-limit slots to a position of the heat source proximate to the bottom of the metal frame, such that the food on both sides of the carrying frame can be heated uniformly in order to barbeque the food to a delicious dish quickly to avoid the food on the side closer to the heat source of the rotating barbeque grill from being burned or overcooked, and the food on the other side farther from the heat source from being cooked insufficiently.

A further objective of the present invention is to provide at least one groove penetrated through each fixed portion, wherein the groove is extended in a direction towards the circumference of the fixed portion for passing a fixing element through the groove to secure and fix the fixed portion to the transmission shaft, such that when the transmission shaft is rotated, the fixing element can slide along the groove together with the rotation of the transmission shaft and abut the fixed portion to drive and rotate the rotating barbeque grill assembly when the fixing element slides to an end of the groove, such that the barbeque apparatus allows the food placed on a side of the carrying frame to be barbequed at a position closer to the heat source without stopping the rotation of the transmission shaft, and turns the food again after a predetermined time (which is the time required for sliding the fixing element from an end to the other end of the groove), the fixing element will drive and turn the rotating barbeque grill assembly, so that the food on the other side of the carrying frame can be barbequed by the heat source, and the food on both sides of the carrying frame can be barbequed uniformly to avoid the food from being cooked too raw or overcooked due to non-uniform barbequing time.

DETAILED DESCRIPTION OF THE PREFERRED EMBODIMENTS

Figure 2:
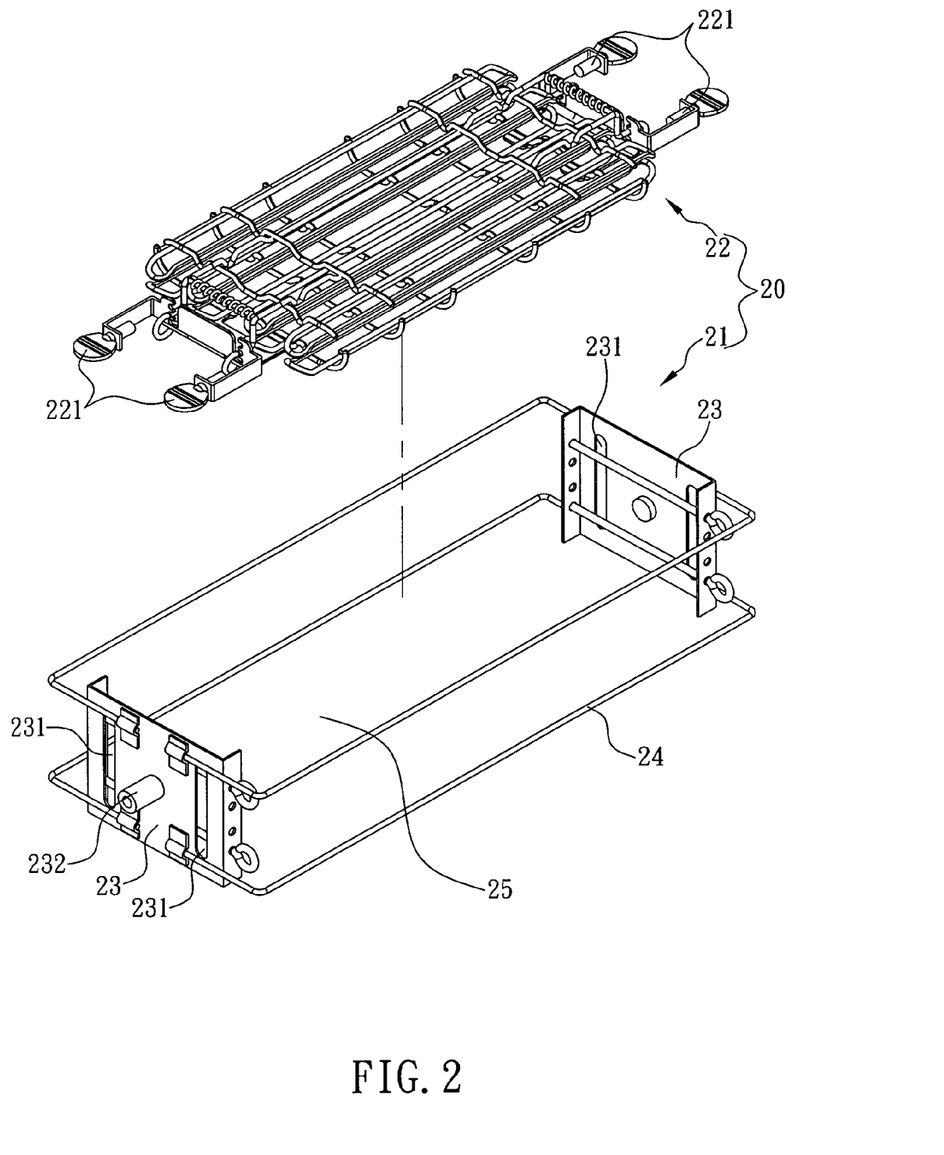
FIG. 2 is an exploded view of a preferred embodiment of the present invention.

The present invention relates to a rotating barbeque grill assembly mounted onto a barbeque apparatus for containing food and turning and barbequing the food on the barbeque apparatus. With reference to FIG. 2 for a rotating barbeque grill assembly in accordance with a preferred embodiment of the present invention, the rotating barbeque grill assembly 20 comprises a metal frame 21 and a carrying frame 22, wherein the metal frame 21 is formed by coupling two positioning bases 23 and a plurality of metal rods 24, and the two positioning bases 23 are symmetrically installed on both corresponding sides of the metal frame 21 respectively, and a containing space 25 is defined in the metal frame 21, and the containing space 25 is in an open form interconnected to the outside.

Figure 3:
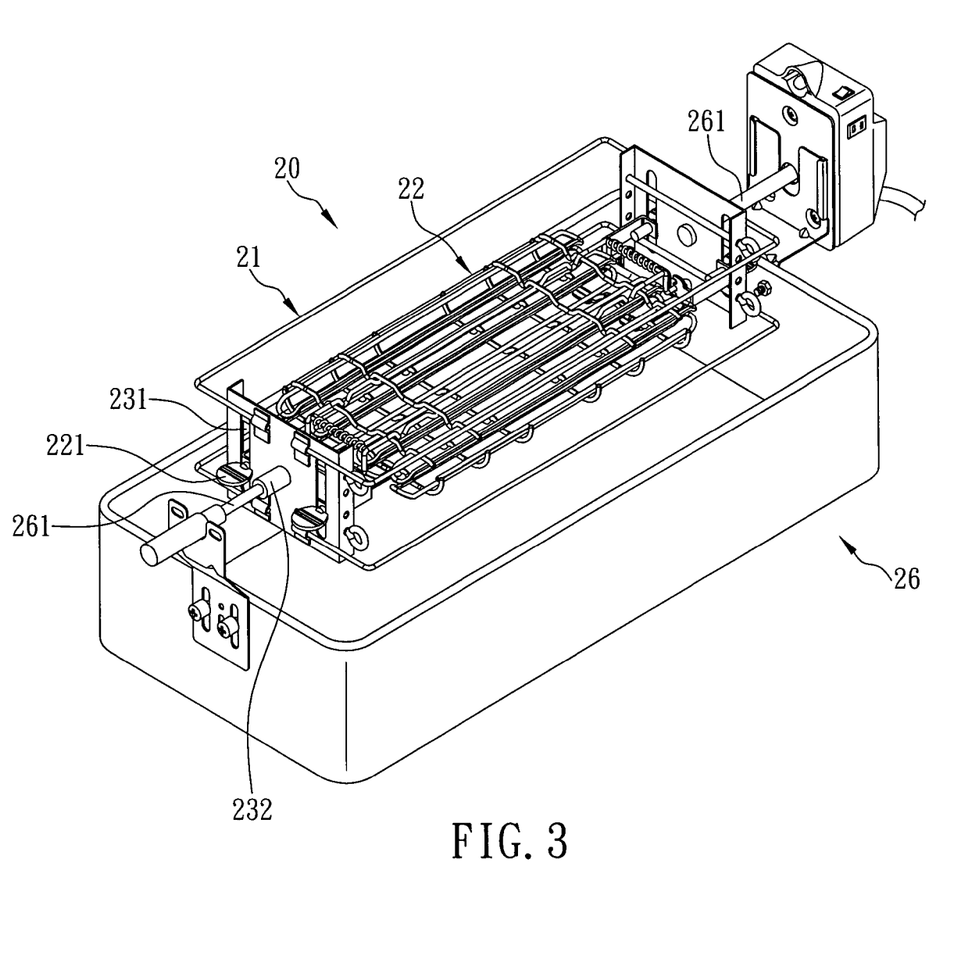
FIG. 3 is a perspective view of a preferred embodiment of the present invention.
Figure 4A:
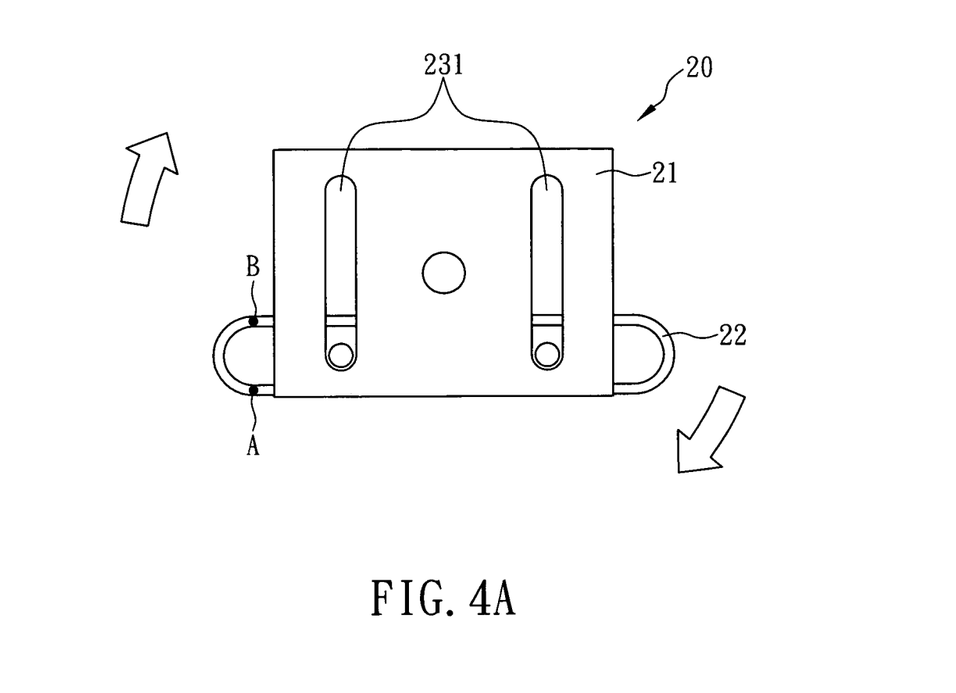
FIG. 4A shows a continuous motion in accordance with a preferred embodiment of the present invention.
Figure 4B:
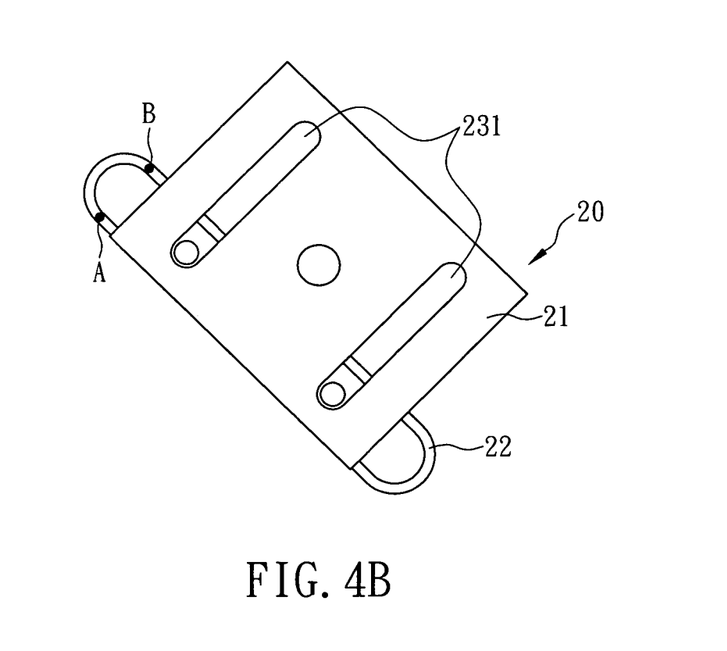
FIG. 4B shows a continuous motion in accordance with a preferred embodiment of the present invention.
Figure 4C:
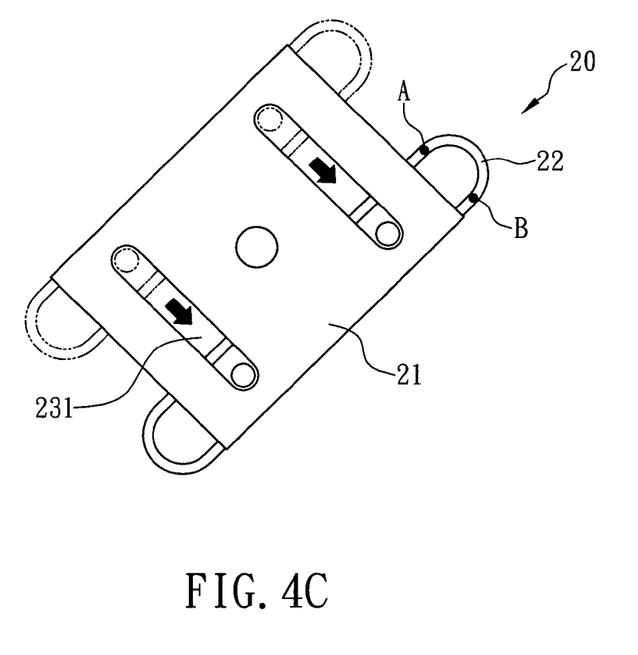
FIG. 4C shows a continuous motion in accordance with a preferred embodiment of the present invention.
Figure 4D:
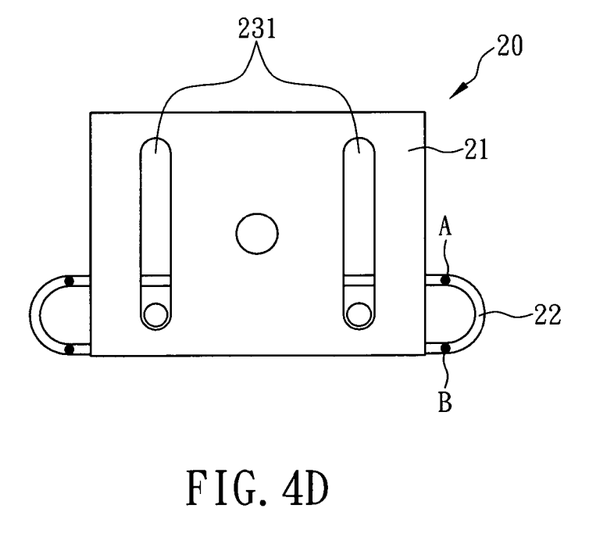
FIG. 4D shows a continuous motion in accordance with a preferred embodiment of the present invention.

In FIG. 2, each positioning base 23 includes at least two position-limit slots 231 penetrated through the positioning base 23 and parallel to each other, and the position-limit slots 231 on the two positioning bases 23 are corresponsive to each other, and two insert rods 221 are installed at both ends of the carrying frame 22 respectively as shown in FIGS. 2 and 3, and the insert rods 221 can be installed into the position-limit slots 231, such that the carrying frame 22 can be fixed into the containing space 25 and can slide along the corresponding position-limit slots 231 together with the rotation of the metal frame 21, and the carrying frame 22 can slide to the allowable lowest position of the position-limit slots 231, and a fixed portion 232 is disposed at a central position of each positioning base 23 and far away from a side of the containing space 25, wherein the fixed portion 232 is substantially in a hollow tube shape, such that two transmission shafts 261 of the barbeque apparatus 26 can be passed into an end of each fixed portion 232 and clamped into the fixed portion 232.

In summation of the description above, after a user puts various kinds of food into the carrying frame 22, installs the insert rods 221 parallelly disposed at both ends of the carrying frame 22 into the position-limit slots 231 on both corresponding sides of the metal frame 21 respectively, and passes each transmission shaft 261 into an end of the corresponding fixed portion 232 to clamp the transmission shaft 261 into the fixed portion 232, the user can turn on the barbeque apparatus 26, such that the rotating barbeque grill assembly 20 can be rotated by using the two transmission shafts 261 as axles, and the heat source of the barbeque apparatus 26 can be used for barbequing the food in the rotating barbeque grill assembly 20. When the rotating barbeque grill assembly 20 is turned to a predetermined angle, the carrying frame 22 is driven by its own gravity to slide the carrying frame 22 from a side originally far away from the heat source along the position-limit slots 231 to the bottom of the metal frame 21 and at a position near the heat source, such that the food on both sides in the carrying frame 22 can be heated uniformly to produce a desired dish quickly and prevent the food closer to the heat source of the conventional rotating barbeque grill of a barbeque apparatus 26 from being overcooked or burned and the food farther from the heat source from being cooked insufficiently.

With reference to FIGS. 3 and 4, it is noteworthy to point out that some of the lines showing the principle of operation of the present invention in FIG. 3 are omitted in FIG. 4. In FIGS. 3 and 4A, when the barbeque apparatus 26 is turned on, the heat source at the bottom of the barbeque apparatus 26 starts barbequing the food on a side of the carrying frame 22 (which is the side A as shown in FIG. 4A). After a predetermined time (such as 10 seconds) is counted by a timer (not shown in the figure) of the barbeque apparatus 26, the barbeque apparatus 26 as shown in FIGS. 3 and 4B will drive and rotate the two transmission shafts 261, such that the rotating barbeque grill assembly 20 can be rotated in 180 degrees (wherein the rotating barbeque grill assembly 20 is rotated clockwise in this preferred embodiment) by using the two transmission shafts 261 as axles. During the process of turning the rotating barbeque grill assembly 20, the carrying frame 22 is still affected its own gravity and remained at the allowable lowest position of the position-limit slots 231 (which is shown by the lower left of FIG. 4B) until the rotating barbeque grill assembly 20 is rotated to an angle of more than 90 degrees, such that when the allowable lowest position of the position-limit slot 231 is moved gradually from the lower left position of FIG. 4B to the lower right position of FIG. 4C, the carrying frame 22 will be affected by its own gravity to slide along the position-limit slots 231 to the lowest position as shown in FIG. 4C, such that the food on the other side (which is the side B as shown in FIG. 4C) of the carrying frame 22 can be barbequed by the heat source at the bottom of the barbeque apparatus 26. After the rotating barbeque grill assembly 20 is rotated to an angle of 180 degrees, the barbeque apparatus 26 will stop rotating the two transmission shafts 261 and then will start driving the two transmission shafts 261 to rotate again after the food on the other side (which the side B as shown in FIG. 4D) of the carrying frame 22 is barbequed for the predetermined time (such as 10 seconds), and the aforementioned procedure is repeated until the food in the carrying frame 22 is cooked uniformly.

With the design of the rotating barbeque grill assembly 20 of the present invention, the carrying frame 22 can be turned quickly, and the carrying frame 22 is affected by its own gravity to slide from a side originally far away from the heat source along the position-limit slots 231 to the allowable lowest position of the position-limit slots 231 to make room at the position of the heat source near the bottom of the metal frame 21, so as to allow the food on both sides of the carrying frame 22 to be barbequed uniformly and repeatedly. Since a predetermined distance between the carrying frame 22 and the heat source can be maintained at the allowable lowest position of the position-limit slots 231, therefore the food closer to the heat source of the conventional rotating barbeque grill may be burned easily, or the food farther from the heat source is cooked insufficiently.

Figure 5:
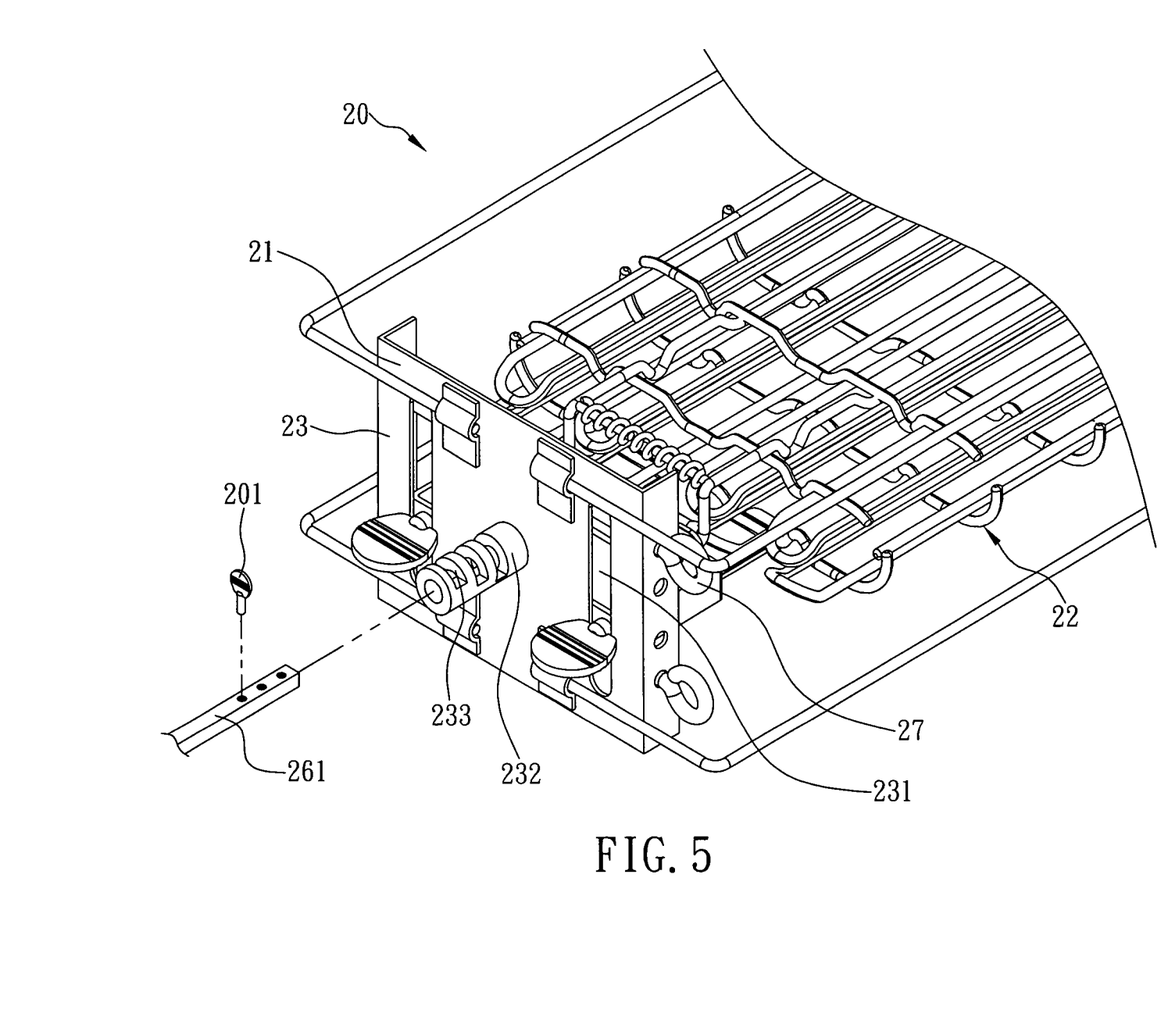
FIG. 5 is a schematic view of detailed components in accordance with a preferred embodiment of the present invention.

With reference to FIG. 5 for a rotating barbeque grill assembly of a preferred embodiment of the present invention, the rotating barbeque grill assembly 20 further comprises two fixing elements 201 (and only one of the fixing elements 201 is shown in FIG. 5 for the purpose of simplifying the illustration of the invention), and each fixing element 201 is passed through the fixed portion 232 on the positioning base 23 and secured onto the transmission shaft 261, such that the transmission shaft 261 can be fixed into the fixed portion 232 or rotated in the fixed portion 232. In addition, each fixed portion 232 of the embodiment includes at least one groove 233 penetrated through the fixed portion 232 and extended in a direction towards the circumference of the fixed portion 232 for passing the fixing element 201 through the groove 233 and securing the fixing element 201 to the transmission shaft 261, such that when the transmission shaft 261 is rotated, the fixing element 201 can slide to an end of the groove 233 along the groove 233 together with the rotation of the transmission shaft 261 and abutted against the fixed portion 232 to drive and rotate the rotating barbeque grill assembly 20. In FIGS. 3 and 5, the barbeque apparatus 26 can barbeque the food fixed at a position on a side of the carrying frame 22 near the heat source without stopping the rotation of the transmission shaft 261, and the fixing element 201 starts driving the rotating barbeque grill assembly 20 to turn again after a predetermined time, such that the food on the other side of the carrying frame 22 can be barbequed by the heat source. Therefore the food on both sides of the carrying frame 22 can be barbequed uniformly to avoid insufficient cooking or overcooking due to the non-uniform barbequing time.

With reference to FIGS. 5 and 6, some of the lines shown in FIG. 5 are omitted in FIG. 6. In FIGS. 5 and 6A, the rotating barbeque grill assembly 20 is maintained at equilibrium, the heat source (not shown in the figure) starts barbequing the food on a side (which is the side C as shown in FIG. 6A) of the rotating barbeque grill assembly 20, and the transmission shaft 261 starts rotating (wherein the transmission shaft 261 is rotated clockwise in this preferred embodiment) and drives the fixing element 201 to slide along the groove 233 together with the rotation of the transmission shaft 261 (Now, the rotating barbeque grill assembly 20 is still maintained at equilibrium and not rotated yet). In FIGS. 5 and 6B, when the fixing element 201 slides to an end of the groove 233 (now, the transmission shaft 261 has rotated 90 degrees), the fixing element 201 will abut the fixed portion 232 and drive the rotating barbeque grill assembly 20 to rotate clockwise. In FIGS. 5 and 6C, during the rotation process of the rotating barbeque grill assembly 20, the rotating barbeque grill assembly 20 is affected by its own gravity, such that the fixed portion 232 can be abutted against the fixing element 201 until the fixed portion 232 is rotated more than 90 degrees, the rotating barbeque grill assembly 20 as shown in FIG. 6D can be turned to an equilibrium position quickly, so that the food on the other side (which is the side D as shown in FIG. 6D) of the rotating barbeque grill assembly 20 can be barbequed by the heat source below. The transmission shaft 261 will continue driving the fixing element 201 to rotate, and the rotating barbeque grill assembly 20 as shown in FIG. 6D will be maintained at equilibrium until the fixing element 201 slides to the end of the groove 233 again and then the fixing element 201 will abut against the fixed portion 232 and drive the rotating barbeque grill assembly 20 to rotate clockwise altogether, and such procedure is repeated until the food in the rotating barbeque grill assembly 20 is barbequed uniformly.

Figure 6A:
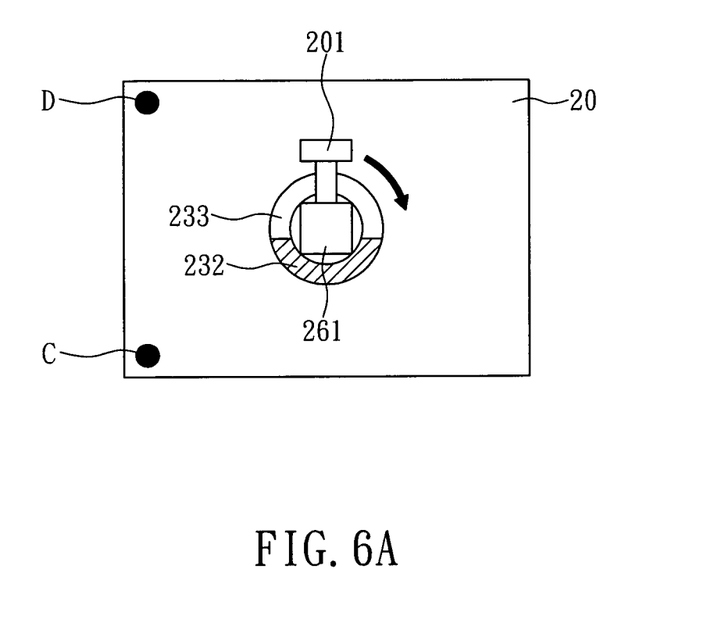
FIG. 6A is a schematic view of another continuous motion in accordance with a preferred embodiment of the present invention.
Figure 6B:
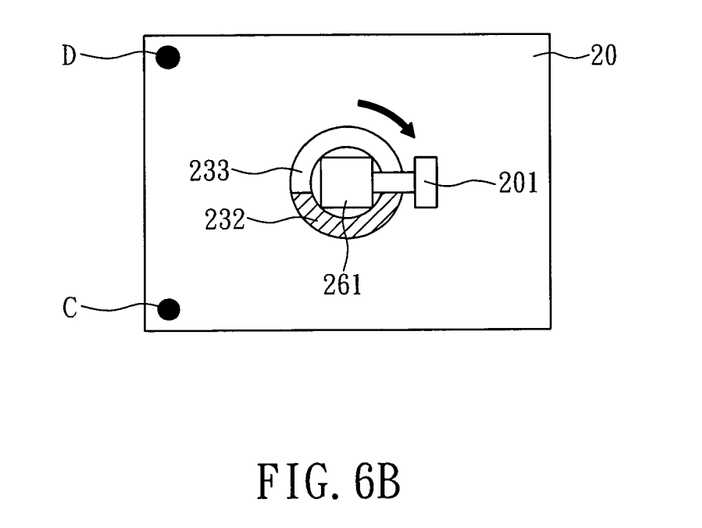
FIG. 6B is a schematic view of another continuous motion in accordance with a preferred embodiment of the present invention.
Figure 6C:
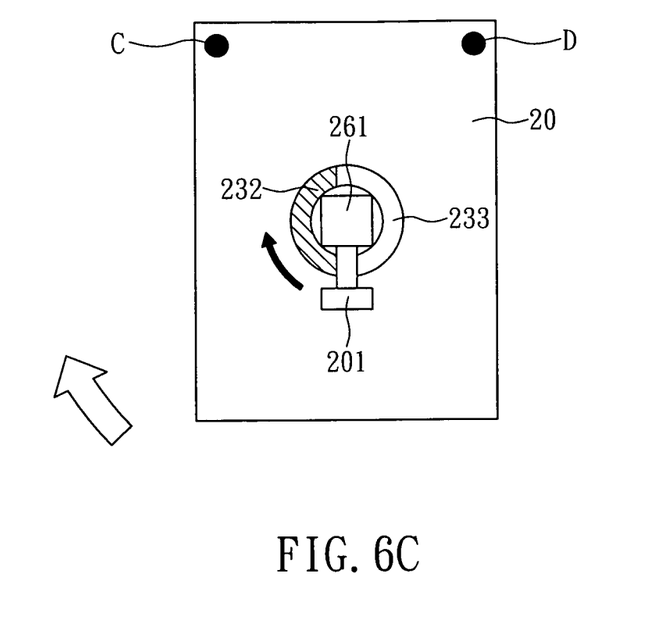
FIG. 6C is a schematic view of another continuous motion in accordance with a preferred embodiment of the present invention.
Figure 6D:
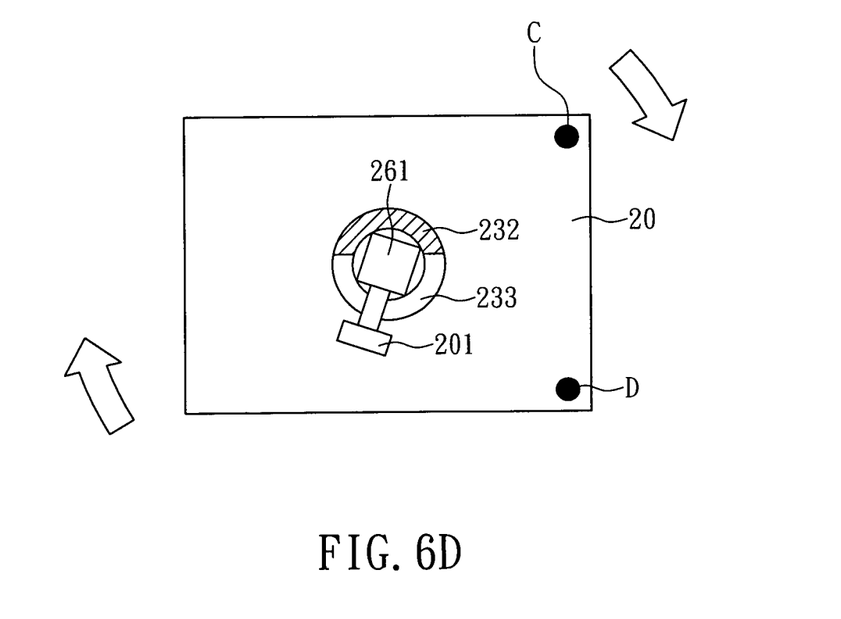
FIG. 6D is a schematic view of another continuous motion in accordance with a preferred embodiment of the present invention.

In summation of the description above, during the process of rotating the transmission shaft 261 for the first 90 degrees, the rotating barbeque grill assembly 20 is maintained at equilibrium, such that the food on a side (which is the side C as shown in FIG. 6A) is barbequed by the heat source until the fixing element 201 slides to the end of the groove 233 and abuts the fixed portion 232. During the process of rotating the transmission shaft 261 at an angle more than 90 degrees, the rotating barbeque grill assembly 20 will be rotated together with the transmission shaft 261 to an erect position and turned to the equilibrium position again quickly, such that the food on the other side (which is the side D as shown in FIG. 6D) can be barbequed by the heat source until the fixing element 201 slides to the end of the groove 233 again. Therefore, the time required for rotating the transmission shaft 261 for 90 degrees is the time for maintaining the rotating barbeque grill assembly 20 at equilibrium and barbequing the food. In other words, the rotating barbeque grill assembly 20 of this preferred embodiment remains at equilibrium within the time of rotating the transmission shaft 261 for the first 90 degrees, such that the food on a side can be barbequed with sufficient time, and then the transmission shaft 261 is rotated for another 90 degrees. Therefore, the rotating barbeque grill assembly 20 is turned to allow the food on the other side of the rotating barbeque grill assembly 20 to be barbequed. Within the time of rotating the transmission shaft 261 for the third 90 degrees, the rotating barbeque grill assembly 20 still remains at equilibrium, such that the food on the other side can be barbequed with sufficiently time. Until the transmission shaft 261 starts rotating for the fourth 90 degrees, the rotating barbeque grill assembly 20 will rotate the transmission shaft 261 again. The aforementioned procedure is repeated until the food in the rotating barbeque grill assembly 20 is cooked uniformly. In this preferred embodiment, although the design of the groove 233 on the fixed portion 232 can turn the rotating barbeque grill assembly 20 by rotating the transmission shaft 261 for 90 degrees only, the time required for rotating the transmission shaft 261 for 90 degrees is the time for keeping the rotating barbeque grill assembly 20 at equilibrium and barbequing the food. In the embodiment, the depth, width and quantity of the grooves 233 on the fixed portion 232 can be changed according to actual manufacturing requirements. For example, the fixed portion 232 further includes three grooves 233, and the grooves 233 is formed at different positions of the fixed portion 232, and the transmission shaft 261 has three fixing elements 201 corresponding to the grooves 233, such that the rotating barbeque grill assembly 20 can keep on rotating the transmission shaft 261 to achieve the equilibrium state, so as to provide an uniform barbeque for both sides of the rotating barbeque grill assembly.

In FIGS. 3 and 5, the positioning base 23 of this preferred embodiment further comprises at least one position-limit rod 27, and the position-limit rod 27 is passed through the positioning base 23 and fixed at a position on the positioning base 23 and proximate to the position-limit slots 231 for stopping the insert rods 221, so that users can adjust the position of the position-limit rod 27 on the positioning base 23 to change the allowable lowest position of the position-limit slots 231. When the carrying frame 22 slides along the position-limit slots 231 to the allowable lowest position of the position-limit slots 231 together with the rotation of the metal frame 21, the allowable lowest position of the position-limit slots 231 is the position for fixing the position-limit rod 27 onto the positioning base 23, such that users can adjust the position of the position-limit rod 27 on the positioning base 23 to change the shortest distance between the carrying frame 22 and the heat source, so as to maintain an appropriate distance between the carrying frame 22 and the heat source, and prevent the food from being cooked insufficiently or overcooked.

In this preferred embodiment as shown in FIG. 2, the food can be contained in the carrying frame 22, and the insert rods 221 on both sides and the metal frame 21 are integrated, or the carrying frame 22 can be an individual long rod (not shown in the figure) having an insert rod 221 installed separately at both ends of the carrying frame 22. Therefore, users simply pass the food into the carrying frame 22 and install the insert rods 221 at both ends of the carrying frame 22 into the corresponding position-limit slots 231 of the two positioning bases 23, such that the carrying frame 22 can be positioned in the containing space 25 and rotated together with the metal frame 21 to slide along the corresponding position-limit slots 231 to achieve the effect of cooking food uniformly and quickly.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A rotating barbeque grill assembly, comprising:
   at least one carrying frame for carrying or inserting food, having at least two insert rods installed at both ends of the carrying frame respectively; and
   a metal frame, formed by coupling two positioning bases and a plurality of metal rods; wherein the two positioning bases are symmetrically disposed on two corresponding sides of the metal frame respectively, and a containing space is defined between the two positioning bases and in an open form interconnected to the outside; wherein the positioning base has at least two position-limit slots parallel to each other, and the position-limit slots formed on the two positioning bases are corresponsive to each other and provided for installing the insert rods into the corresponding position-limit slots respectively; and wherein each of the two positioning bases has a fixed portion disposed at a central position away from a side of the containing space, and the two fixed portions are respectively coupled or fixed to two transmission shafts of a barbeque apparatus;
   thereby, when the carrying frame is installed to the metal frame through installing the insert rods into the corresponding position-limit slots, the carrying frame can be positioned into the containing space, rotated together with the metal frame by the two transmission shafts, and slid along the position-limit slots after the carrying frame is rotated to a predetermined angle;
   and wherein the fixed portions are substantially in a hollow tube shape, such that the two transmission shafts of the barbeque apparatus can be inserted into the fixed portions and clamped and positioned in the fixed portions, respectively;
   and further comprising at least one fixing element passed through the fixed portion and secured onto the transmission shaft, such that the transmission shaft can be fixed into the fixed portion or rotated with the fixed portion;
   and wherein the fixed portion includes at least one groove penetrated through the fixed portion, and extended in a direction towards the circumference of the fixed portion, such that the fixing elements can be passed through the groove and secured to the transmission shaft to slide along the groove, and when the fixing element contacts the end of the groove in the fixed portion, the carrying frame is rotated along with/the transmission shaft.

2. The rotating barbeque grill assembly of claim 1, wherein the positioning base further comprises at least one position-limit rod passed through the positioning base and fixed at a position of the position-limit slot proximate to the positioning base, such that when the carrying frame slides along the position-limit slot, the insert rod of the carrying frame is provided for stopping the carrying frame at a position.

* * * * *